United States Patent
Khanna et al.

(10) Patent No.: US 8,191,133 B2
(45) Date of Patent: May 29, 2012

(54) ANTI-REPLAY PROTECTION WITH QUALITY OF SERVICES (QOS) QUEUES

(75) Inventors: Bakul Khanna, Lexington, MA (US); William A. Miller, III, Groton, MA (US); Jozef Babiarz, Kanata (CA)

(73) Assignee: Avaya Inc., Basking Ridge, NJ (US)

( * ) Notice: Subject to any disclaimer, the term of this patent is extended or adjusted under 35 U.S.C. 154(b) by 1188 days.

(21) Appl. No.: 12/002,729

(22) Filed: Dec. 17, 2007

(65) Prior Publication Data
US 2009/0158417 A1 Jun. 18, 2009

(51) Int. Cl.
*H04L 29/06* (2006.01)
(52) U.S. Cl. .......................................................... 726/12
(58) Field of Classification Search ..................... 726/12
See application file for complete search history.

(56) References Cited

U.S. PATENT DOCUMENTS

| | | | |
|---|---|---|---|
| 7,571,343 B1* | 8/2009 | Xiang et al. ...................... 714/2 |
| 2004/0008711 A1* | 1/2004 | Lahti et al. ..................... 370/428 |
| 2004/0117653 A1* | 6/2004 | Shapira et al. ................ 713/201 |
| 2004/0205332 A1* | 10/2004 | Bouchard et al. ............. 713/153 |
| 2007/0115812 A1* | 5/2007 | Hughes .......................... 370/229 |
| 2008/0295163 A1* | 11/2008 | Kang .............................. 726/13 |

* cited by examiner

*Primary Examiner* — Michael S McNally
(74) *Attorney, Agent, or Firm* — Chapin IP Law, LLC (57) ABSTRACT

An embodiment of the present invention includes a technique to provide anti-replay protection with QoS queues. A single global anti-replay window is maintained to have global lowest and highest sequence numbers for an Internet protocol security (IPSec) security association (SA). The single global anti-replay window is associated with individual differentiated services code point (DSCP) or DSCP group, the individual DSCP or DSCP group corresponding to individual per-DSCP anti-replay windows. A received packet having a sequence number is pre-processed before packet processing using the single global anti-replay window. The received packet is post-processed after packet processing using the individual per-DSCP anti-replay windows.

20 Claims, 9 Drawing Sheets

ANTI-REPLAY PROTECTION WITH QUALITY OF SERVICES (QOS) QUEUES

BACKGROUND

1. Field of the Invention

Embodiments of the invention relate to the field of network communication, and more specifically, to anti-replay protection.

2. Description of Related Art

Internet Protocol (IP) Security (IPSec) anti-replay protection is a security service in which the receiver may reject old or duplicate packets to protect itself against replay attacks. IPSec anti-replay works by having the sender apply a unique sequence number to the IPSec header for all encrypted packets within an IPSec Security Association (SA). The receiver checks off the sequence numbers of the packets it has seen. The sender assigns sequence numbers in an increasing order. The receiver remembers the value X of the highest sequence number that it has already seen. N is the window size and the receiver also remembers whether it has seen packets having sequence numbers from X-N+1 through X. Any received packets with sequence numbers that have already been seen are discarded In addition, any received packet with sequence number X-N (or less) is discarded.

At times, however, this sliding window based anti-replay protection mechanism causes good packets to be discarded. For example, Quality of Services (QoS) queues, at various network elements, allow newer real-time packets to pass older non-real-time packets, causing mis-ordering of packets within an IPSec SA and causing the anti-replay mechanism to discard good, older non-real-time packets, since they are received late.

BRIEF DESCRIPTION OF THE DRAWINGS

Embodiments of the invention may best be understood by referring to the following description and accompanying drawings that are used to illustrate embodiments of the invention. In the drawings:

FIG. 1 is a diagram illustrating a system according to one embodiment of the invention.

FIG. 2 is a diagram illustrating an anti-replay protection according to one embodiment of the invention.

FIG. 3 is a flowchart illustrating a process to perform QoS anti-replay protection according to one embodiment of the invention.

FIG. 4 is a flowchart illustrating a process to maintain a single global anti-replay window according to one embodiment of the invention.

FIG. 5 is a flowchart illustrating a process to pre-process a received packet according to one embodiment of the invention.

FIG. 6 is a flowchart illustrating a process to post-process a received packet according to one embodiment of the invention.

FIG. 7 is a flowchart illustrating a process to advance individual per-DSCP anti-replay window according to one embodiment of the invention.

FIG. 8 is a diagram illustrating a receiving virtual private network gateway according to one embodiment of the invention.

FIG. 9 is a diagram illustrating a QoS anti-replay processor according to one embodiment of the invention.

DESCRIPTION

An embodiment of the present invention includes a technique to provide anti-replay protection with QoS queues. A single global anti-replay window is maintained to have global lowest and highest sequence numbers for an Internet Protocol security (IPSec) security association (SA). The single global anti-replay window is associated with individual differentiated services code point (DSCP) or DSCP group. The individual DSCP or DSCP group corresponds to individual per-DSCP anti-replay windows. A received packet having a sequence number is pre-processed before packet processing using the single global anti-replay window. This is because the DSCP in the outer IP header of the received packet may not be trusted. It is not authenticated The received packet is post-processed after packet processing using the individual per-DSCP anti-replay windows since it is possible to have access to the DSCP from the inner IP header, which is trusted.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention allow the use of IPSec anti-replay protection along with QoS queues on various network elements, in a scalable manner. The technique provides a solution to the problem of mis-ordered IPSec packets being discarded at the anti-replay check at the receiver. IPSec packets get mis-ordered as a result of QoS queues at various network elements between sender and receiver Virtual Private Network (VPN) gateways. The technique provides a mechanism of performing anti-replay check at the receiver on a per-DSCP basis, for each IPSec SA. Instead of having a single anti-replay window for each IPSec SA, there are multiple anti-replay windows for each IPSec SA corresponding to the maximum possible values of DSCPs or DSCP groups. There are 64 possible values due to the 6-bit DSCP field, but not all DSCP values have been defined yet. In addition, some DSCPs can be combined to form DSCP groups, which can be represented by a single anti-replay window. So, in practice, there would be a much smaller number. Within each of these individual per-DSCP anti-replay windows, received IPSec packets maintain their ordering and would not result in discards due to QoS queue related mis-ordering.

Along with using DSCP from the inner Internet Protocol (IP) header for anti-replay comes another concern, i.e., performance during a denial-of-service (DOS) attack. In other words, there is a need to invest large number of processor cycles into processing (e.g., decrypting) the packet to retrieve DSCP from inner IP header and then determine that the packet needs to be dropped. An embodiment of the invention also specifies a mechanism to solve this problem.

A single global anti-replay window is maintained to have global lowest and highest sequence numbers for an IPSec SA. The single global anti-replay window is associated with individual DSCP or DSCP groups which corresponds to per-DSCP anti-replay windows. A per-DSCP anti-replay window may be either per-DSCP or per-DSCP-group. For example, for a DSCP of CS6, it would have an anti-replay window per DSCP. But for DSCPs of assured forwarding (AF) classes such as AF31, AF32, AF33, it would have a single anti-replay window for DSCP-group AF3x. A received packet having a sequence number is pre-processed before packet processing using the single global anti-replay window. The received packet is post-processed after packet processing using the individual per-DSCP anti-replay windows. On the sender VPN Gateway, when the sequence number is about to wrap, it initiates an IPSec SA re-key, so no special handling of wrap conditions for the multiple anti-replay windows on the receiving VPN gateways.

Embodiments of the invention are standards based, since the way sequence numbers are incremented on the sender, continues to be as per IPSec standards. Embodiments of the invention provide a solution to the problem in a specific single vendor environment, while maintaining interoperability (e.g., without enhanced solution) in a multi-vendor environment.

Figure 1:
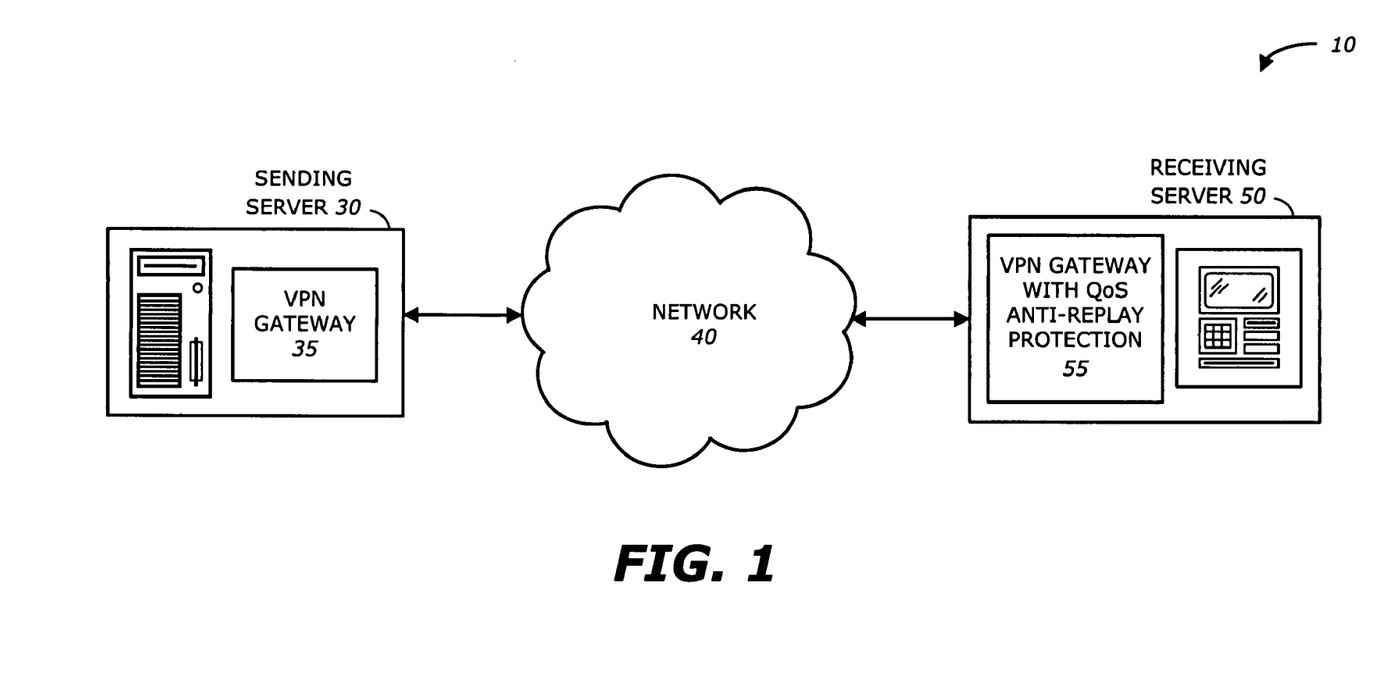

FIG. 1 is a diagram illustrating a system 10 according to one embodiment of the invention. The system 10 includes a sending server 30, a network 40, and a receiving server 50. The system 10 may include more or less than the above elements. For example, there may be more than one receiving server.

The sending server 30 is a server that transmits or sends packets through the network 40. The packets sent by the sending server 30 may be any packets such as data packets, media packets (e.g., audio, video), or any other types of packets. The sending server 30 includes at least a VPN gateway 35. The VPN gateway 35 is the network element that is interfaced to the network 40 to perform communication transactions with the receiving server 50 though the network 40. The VPN gateway 35 is typically a computer system having a processor and memory to store programs or instructions. The VPN gateway 35 may also be implemented by specialized hardware circuits, devices, or modules. It may also be implemented as a combination of hardware, software, and firmware.

The network 40 may be any type of communication network such as the Internet, intranet, extranet, Local Area Network (LAN), Wide Area Network (WAN), wireless network, etc. In one embodiment, the network 40 is constructed to support virtual private network (VPN). The VPNs create secure connections, called tunnels, through public shared communication infrastructures like the Internet. These tunnels are not physical entities, but logical constructs, created using encryption, security standards, and protocols. In one embodiment, the VPNs employ security protocols such as IPSec. IPSec is a set of open standards and protocols for creating and maintaining secure communications over IP networks. IPSec VPNs use these standards and protocols to ensure the privacy and integrity of data transmission and communications across public networks like the Internet.

The receiving server 50 is a server that receives the packets transmitted by the sending server 30. The receiving server 50 includes a VPN gateway with QoS anti-replay protection 55. The VPN gateway 55 implements embodiments of the invention to provide a mechanism for anti-replay protection for packets with QoS queues. Like the VPN gateway 35, the VPN gateway 55 is typically a computer system having a processor and memory to store programs or instructions. It may also be implemented by specialized hardware circuits, devices, or modules. It may also be implemented as a combination of hardware, software, and firmware.

The sending and receiving servers 30 and 40 communicate securely through an IPSec VPN through the network 40. Before doing so, they agree on the security parameters to use during communication, establishing what is called a security association (SA). The SA specifies the authentication and encryption algorithms to be used, the encryption keys to be used during the session, and how long the keys and the security association itself are maintained.

Figure 2:
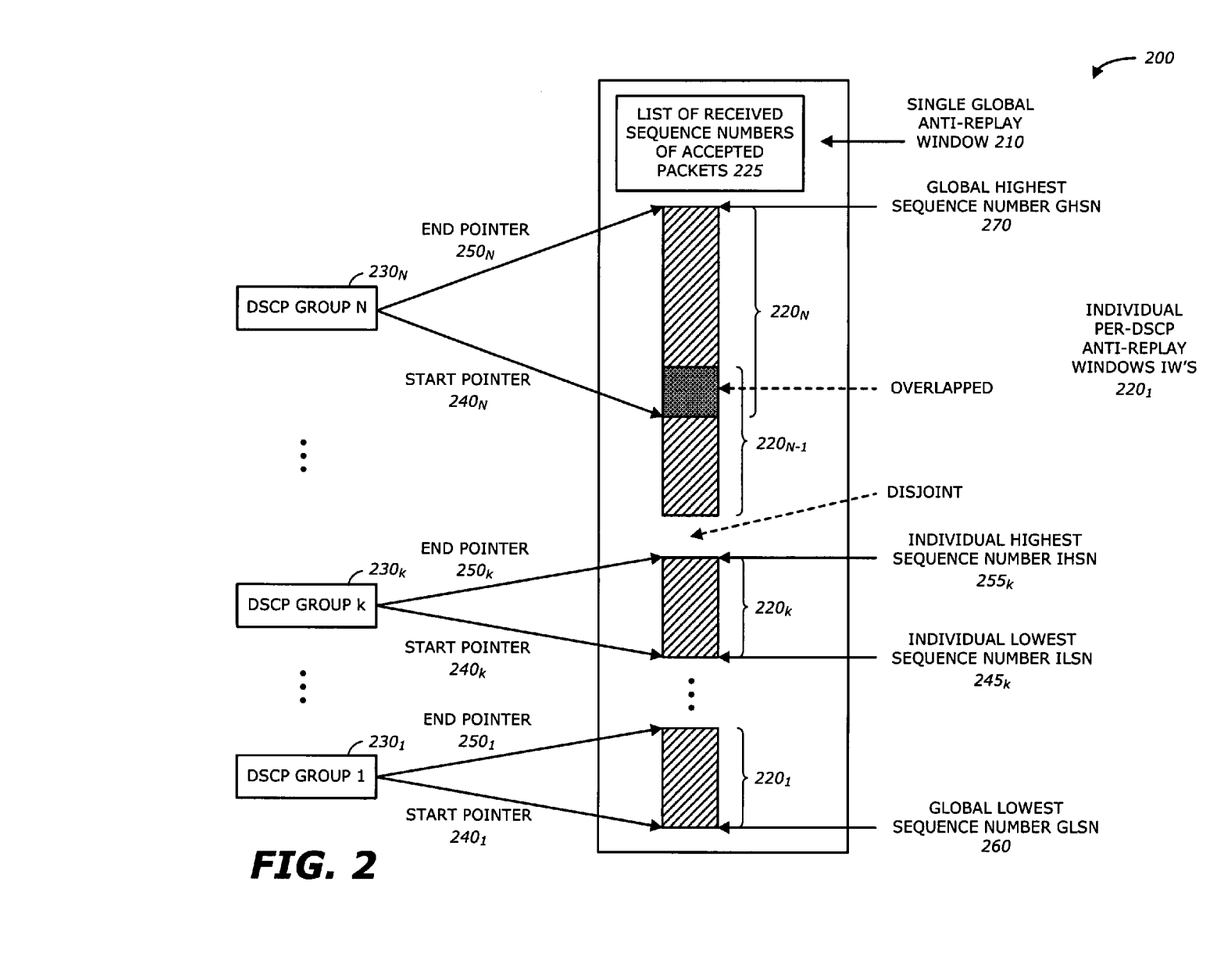

FIG. 2 is a diagram illustrating an anti-replay protection 200 according to one embodiment of the invention. The anti-replay protection 200 includes a QoS anti-replay processor 205, a single global anti-replay window 210 and N DSCP groups $230_1$ to $230_N$.

The QoS anti-replay processor 205 performs operations on the single global anti-replay window 210. The operations may include maintaining, pre-processing, processing, and post-processing. The QoS anti-replay processor 205 may be implemented by hardware, software, or firmware, or any combination thereof. The QoS anti-replay processor 205 may implement the functions described in the processes shown in FIGS. 3 through 7. These processes may include functions or modules that may be implemented by hardware circuits or software routines.

The size of the single global anti-replay window 210 may be configurable. Based on the sequence numbers of the received packets, at any time, the single global anti-replay window 210 has a global lowest sequence number (GLSN) 260 and a highest sequence number (GHSN) 270 for an IPSec SA. It has N individual per-DSCP anti-replay windows $220_1$ to $220_N$ corresponding to N DSCP groups $230_1$ to $230_N$ and a list 225.

Each of the N individual per-DSCP anti-replay windows $220_1$ to $220_N$ may be constructed and maintained in the normal manner for the traditional anti-replay windows. An individual per-DSCP anti-replay window $220_k$ (k=1, ..., N) is limited by an individual lowest sequence number (ILSN) $245_k$ and an individual highest sequence number (IHSN) $255_k$. The N individual per-DSCP anti-replay windows $220_1$ to $220_N$ may be disjoint, partially overlapped, or completely overlapped. A DSCP group $230_k$ (k=1, ..., N) has a start pointer $240_k$ pointing to the ILSN $245_k$ and an end pointer $250_k$ pointing to the IHSN $255_k$.

The list 225 contains all the sequence numbers of packets that have been accepted with the global anti-replay window 210. Each time a packet is received, the QoS anti-replay 205 perform operations including pre-processing, processing (e.g., decrypting), and post-processing. The result of these operations is a decision to discard or accept the received packet. If it is accepted, its sequence number is stored in the list 225. The list 225 may be implemented by any suitable method. For a hardware-oriented implementation, it may be a memory, a storage element, or a first-in-first out queue. For a software-oriented implementation, it may be an array, a linked list, or any convenient data structure. In one embodiment, the list 225 may be implemented as a content addressable memory (CAM) to facilitate the searching of the stored sequence numbers.

Figure 3:
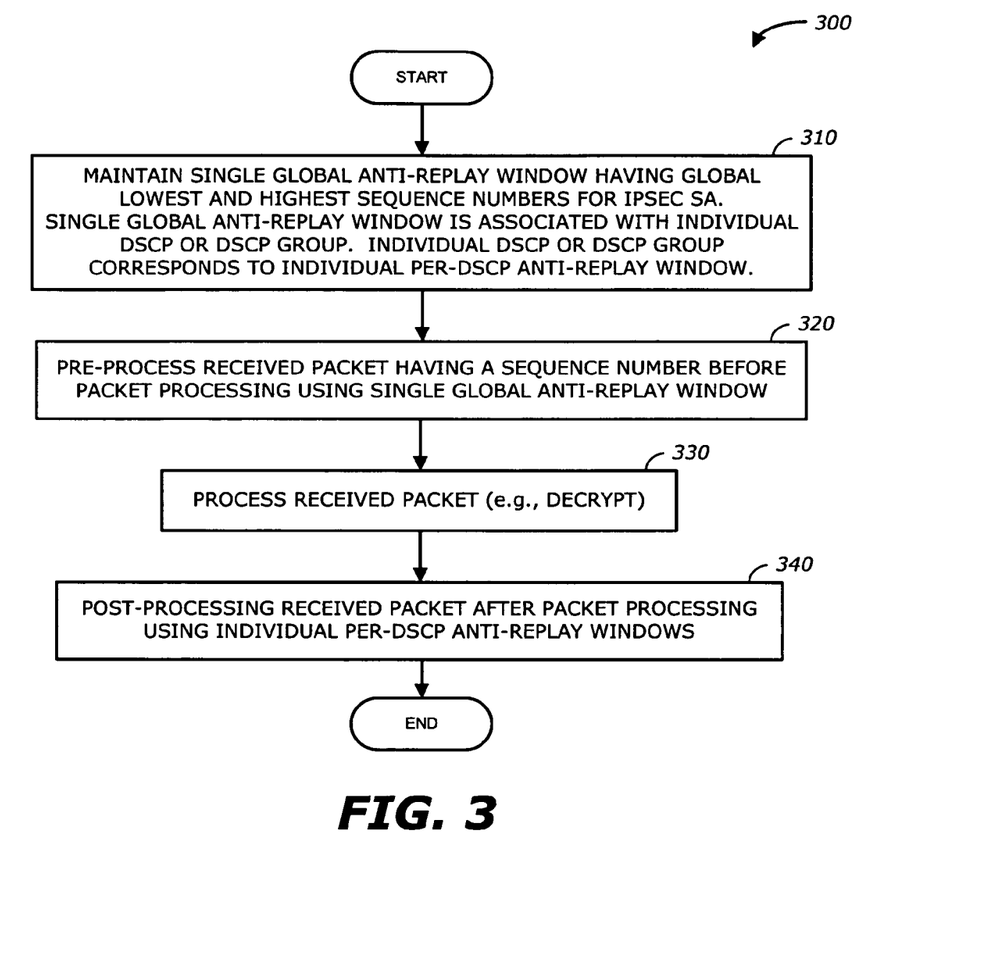

FIG. 3 is a flowchart illustrating a process 300 to perform QoS anti-replay protection according to one embodiment of the invention.

Upon START, the process 300 maintains a single global anti-replay window having global lowest and highest sequence numbers for an IPSec SA (Block 310). The single global anti-replay window is associated with individual DSCP or DSCP group. The individual DSCP or DSCP group corresponds to individual per-DSCP anti-replay window. Next, the process 300 pre-processes a received packet having a sequence number before packet processing using the single global anti-replay window (Block 320). Then, the process 300 processes the received packet (Block 330). This may include standard operations such as decrypting. Next, the process 300 post-processes the received packet after packet processing using the individual per-DSCP anti-replay windows (Block 340). The process 300 is then terminated.

Figure 4:
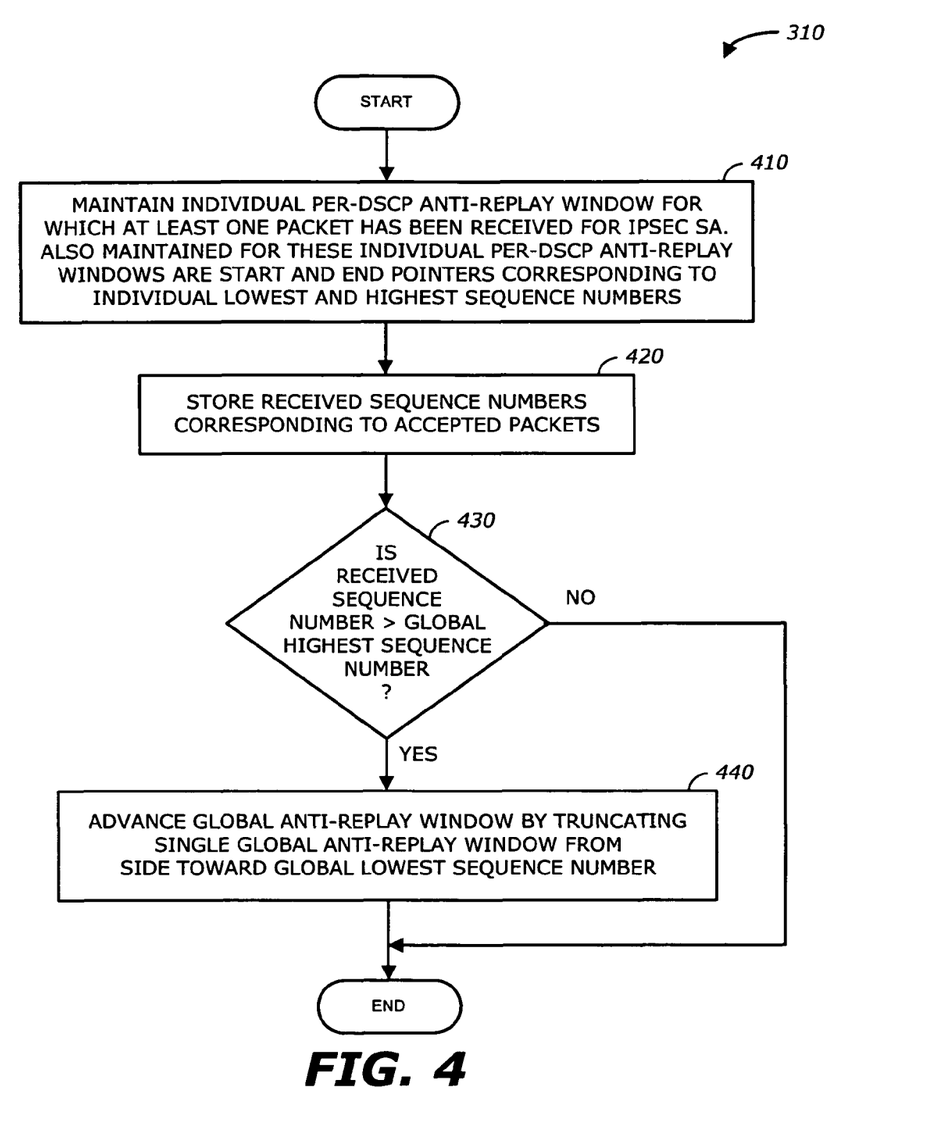

FIG. 4 is a flowchart illustrating the process 310 shown in FIG. 3 to maintain a single global anti-replay window according to one embodiment of the invention.

Upon START, the process 310 maintains an individual per-DSCP anti-replay window for which at least one packet has been received for the IPSec SA (Block 410). Also maintained for these individual per-DSCP anti-replay windows are start and end pointers corresponding to individual lowest and highest sequence numbers.

Next, the process 310 stores received sequence numbers corresponding to accepted packets (Block 420). Then, the process 310 determines if the received packet sequence number is greater than a global highest sequence number (Block 430). If not, the process is terminated. Otherwise, the process 310 advances the single global anti-replay window by truncating the single global anti-replay window from a side toward the global lowest sequence number (Block 440). This is to keep as much information as possible from the most recent accepted packets. The process 310 is then terminated.

Figure 5:
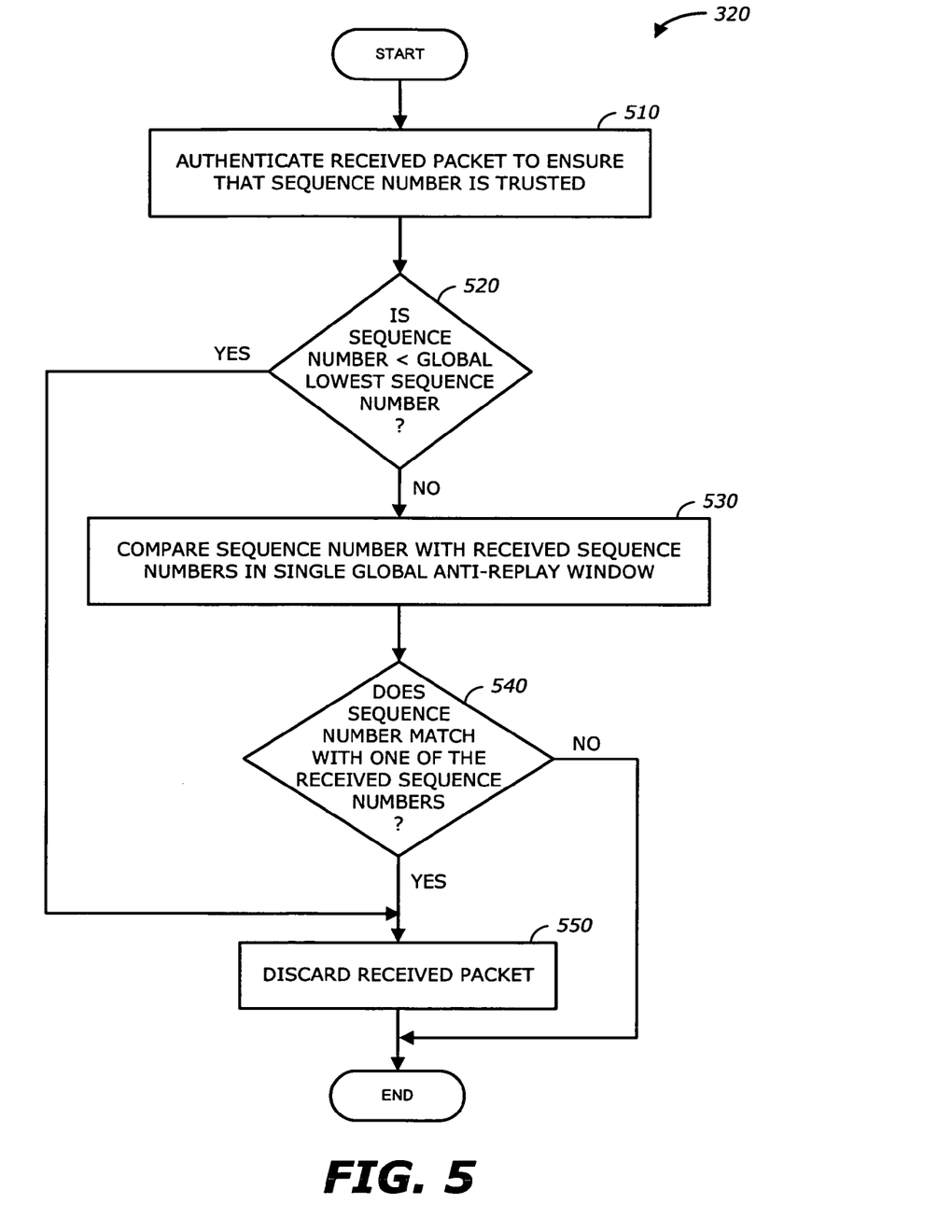

FIG. 5 is a flowchart illustrating the process 320 shown in FIG. 3 to pre-process e received packet according to one embodiment of the invention.

Upon START, the process 320 authenticates the received packet to ensure that the sequence number is trusted (Block 510). Next, the process 320 determines if the sequence number of the received packet is lower than the global lowest sequence number (Block 520). If so, the process 320 goes to block 550 to discard the packet. Otherwise, the process 320 compares the sequence number with received sequence numbers in the single global anti-replay window (Block 530). Then, the process 320 determines if the sequence number matches with one of the received sequence numbers (Block 540). If so, the process 320 discards the packet (Block 550) and is then terminated. Otherwise, the process 320 is terminated.

Figure 6:
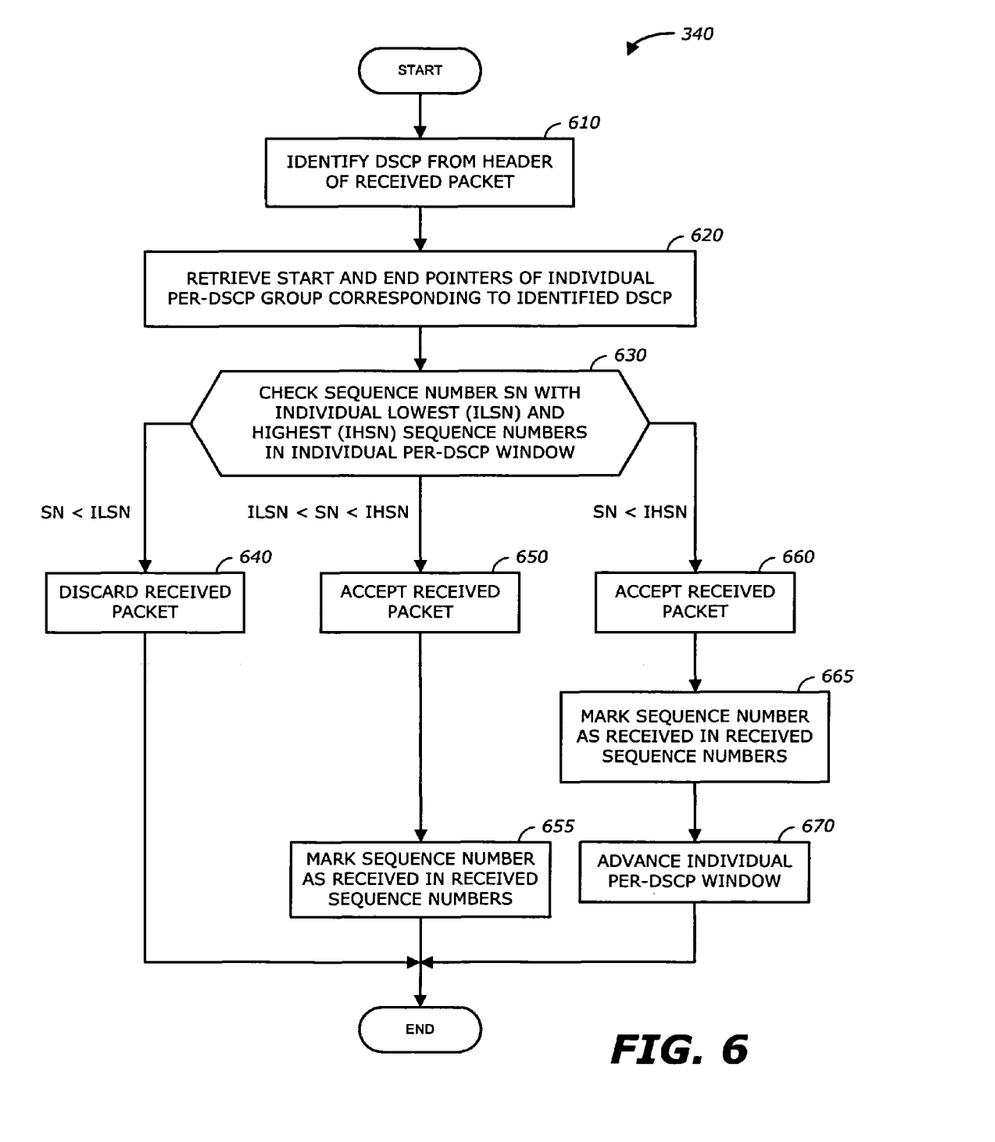

FIG. 6 is a flowchart illustrating the process 340 shown in FIG. 3 to post-process e received packet according to one embodiment of the invention.

Upon START, the process 340 identifies a DSCP from header of the received packet (Block 610). This may be performed by retrieving the DSCP information embedded in the inner header of the received packet. Next, the process 340 retrieves start and end pointers of the individual per-DSCP group corresponding to the identified DSCP (Block 620). Then, the process 340 checks the sequence number SN of the received packet with the individual lowest and highest sequence numbers, ILSN and IHSN, respectively, in the individual per-DSCP window (Block 630).

If the sequence number SN is lower than the individual lowest sequence number ILSN, the process 340 discards the received packet (Block 640) and is then terminated. If the sequence number SN is within the individual lowest and highest sequence numbers (ILSN and IHSN), the process 340 accepts the received packet (Block 650). Then, the process 340 marks the sequence number as received in the received sequence numbers (e.g., the list 225 shown in FIG. 2) (Block 655), and is then terminated. If the sequence number is higher than the individual highest sequence number, the process 340 accepts the received packet (Block 660). Then, the process 340 marks the sequence number as received in the received sequence numbers (e.g., the list 225 shown in FIG. 2) (Block 665). Next, the process 340 advances the individual per-DSCP window (Block 670) and is then terminated.

Figure 7:
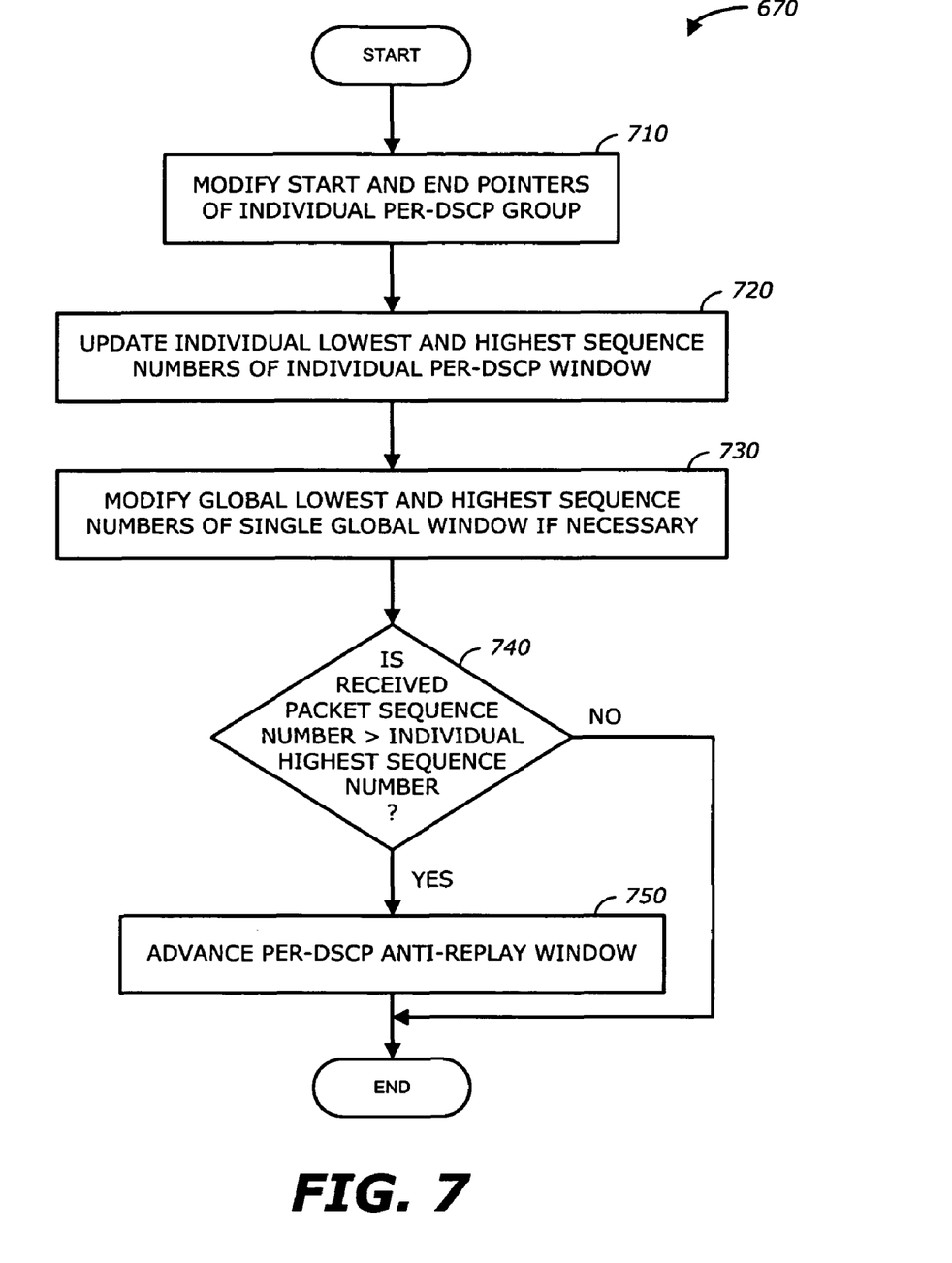

FIG. 7 is a flowchart illustrating the process 670 to advance individual per-DSCP anti-replay window according to one embodiment of the invention.

Upon START, the process 670 modifies start and end pointers of the individual per-DSCP group (Block 710). Then, the process 670 updates the individual lowest and highest sequence numbers of the individual per-DSCP window (Block 720). When a packet is being post-processed, against the individual per-DSCP anti-replay windows, the sequence number is marked as received and the window is advanced according to normal mechanisms.

Next, the process 670 modifies the global lowest and highest sequence numbers of the single global window if necessary (Block 730). For example, when the individual highest sequence number is increased because the sequence number of the received packet is greater than the individual highest sequence number, and this increase goes beyond the current global highest sequence number, then the global highest sequence number is changed to be the same as the increased individual highest sequence number.

Then, the process 670 determines if the per-DSCP anti-replay window needs to be advanced due to received sequence number being greater than the individual highest sequence number (Block 740). If not, the process 670 is terminated. Otherwise, the process 670 advances the per-DSCP anti-replay window (Block 750). The process 670 is then terminated.

Figure 8:
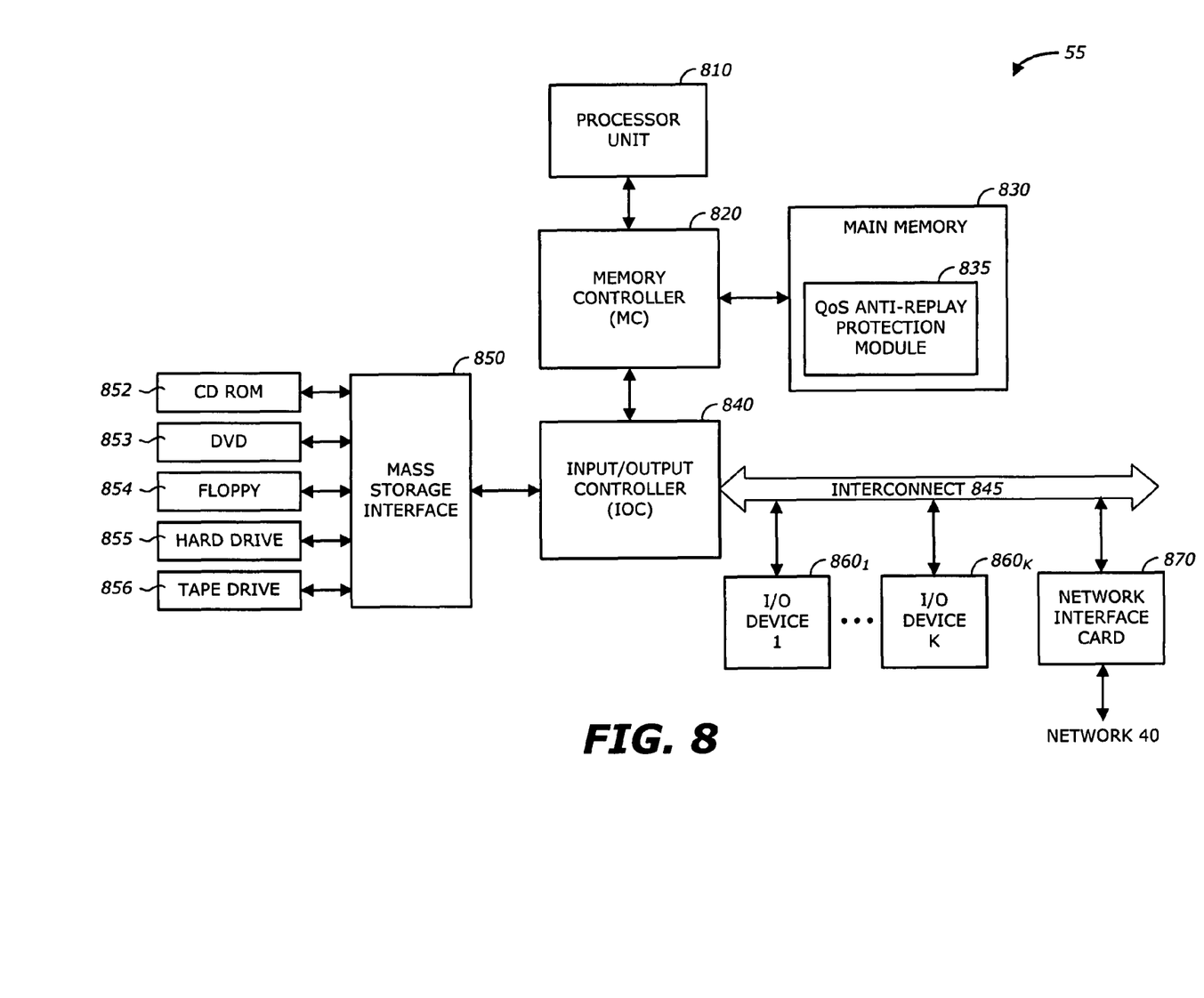

FIG. 8 is a diagram illustrating the receiving VPN gateway 55 shown in FIG. 1 according to one embodiment of the invention. The VPN gateway 55 includes a processor unit 810, a memory controller (MC) 820, a main memory 830, an input/output controller (IOC) 840, an interconnect 845, a mass storage interface 850, and input/output (I/O) devices $880_1$ to $880_K$. The content packaging unit 130 and/or the receiving device 160 may contain more or less than the above components.

The processor unit 810 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 820 provides control and configuration of memory and input/output devices such as the main memory 830 and the IOC 840. The MC 820 may be integrated into a chipset that integrates multiple functionalities such as graphics, media, isolated execution mode, host-to-peripheral bus interface, memory control, power management, etc. The MC 820 or the memory controller functionality in the MCH 820 may be integrated in the processor unit 810. In some embodiments, the memory controller, either internal or external to the processor unit 810, may work for all cores or processors in the processor unit 810. In other embodiments, it may include different portions that may work separately for different cores or processors in the processor unit 810.

The main memory 830 stores system code and data. The main memory 830 is typically implemented with dynamic random access memory (DRAM), static random access memory (SRAM), or any other types of memories including those that do not need to be refreshed. The main memory 830 may include multiple channels of memory devices such as DRAMs. The main memory 830 may include a QoS anti-replay protection module 835. The QoS anti-replay protection module 835 includes program instructions and data to perform QoS anti-replay protection as described above.

The IOC 840 has a number of functionalities that are designed to support I/O functions. The IOC 840 may also be integrated into a chipset together or separate from the MC 820 to perform I/O functions. The IOC 840 may include a number of interface and I/0 functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 855 provides interface to peripheral devices. The interconnect 855 may be point-to-point or connected to multiple devices. For clarity, not all interconnects are shown. It is contemplated that the interconnect 855 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 850 interfaces to mass storage devices to store archive information such as code, programs, files, data, and applications. The mass storage interface 850 may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include a compact disk (CD) read-only memory (ROM) 852, a digital versatile disc (DVD) 853, a floppy drive 854, a hard drive 855, a tape drive 856, and any other magnetic or optic storage devices. The mass storage device provides a mechanism to read machine-accessible media.

The I/O devices $860_1$ to $860_K$ may include any I/O devices to perform I/O functions. Examples of I/O devices $860_1$ to $860_K$ include controller for input devices (e.g., keyboard, mouse, trackball, pointing device, and remote control unit), media card (e.g., audio, video, and graphic), and any other peripheral controllers. The network interface card 870 provides interface to the network 40.

Figure 9:
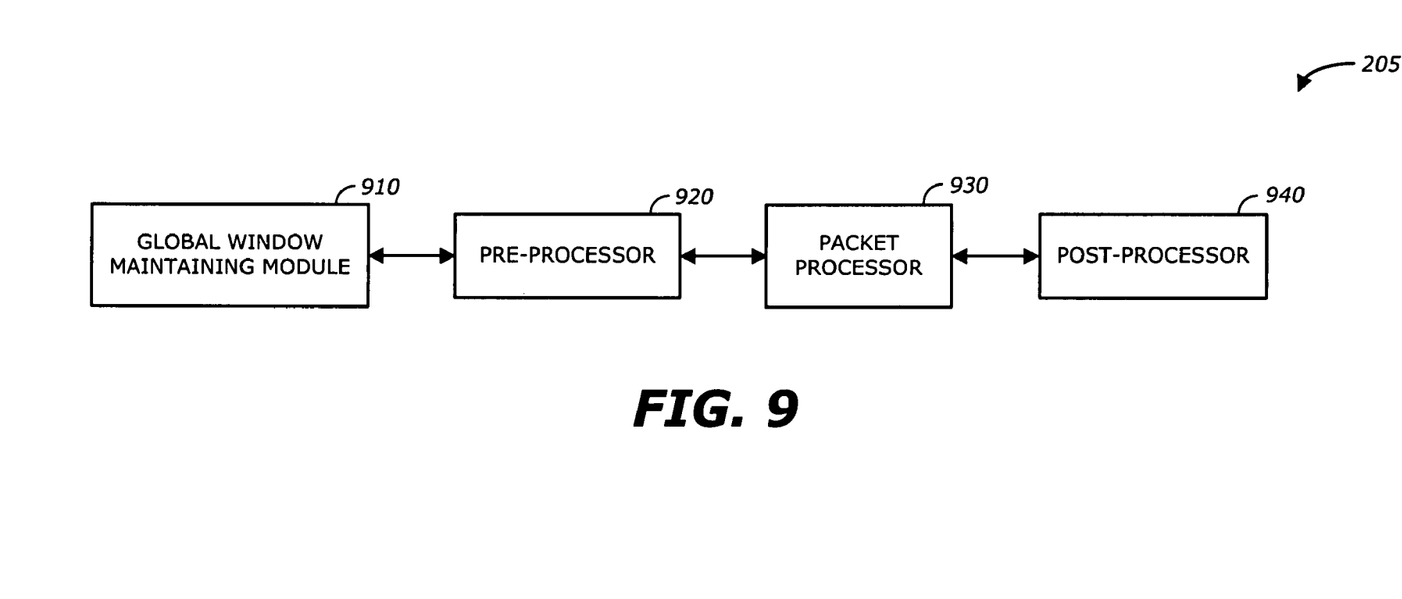

FIG. 9 is a diagram illustrating the QoS anti-replay processor 205 shown in FIG. 2 according to one embodiment of the invention. The processor 205 essentially includes modules, circuits, or processing units to perform operations as described in the processes shown in FIGS. 3 to 7. The processor 205 includes a global window maintaining module 910, a pre-processor 920, a packet processor 930, and a post-processor 940. The processor 205 may include more or less than the above components.

The global window maintaining module 910 maintains a single global anti-replay window having global lowest and highest sequence numbers for an IPSec SA. The single global anti-replay window is associated with individual DSCP or DSCP group which corresponds to individual per-DSCP anti-replay window. The global window maintaining module includes an individual window maintaining module and a memory. The individual window maintaining module maintains the individual per-DSCP anti-replay window for which at least one packet has been received for the IPSec SA. The individual maintaining module also maintains start and end pointers corresponding to individual lowest and highest sequence numbers. The memory stores received sequence numbers corresponding to accepted packets.

The pre-processor 920 is coupled to the global window maintaining module 910 to pre-process a received packet having a sequence number before packet processing by the packet processor 930 using the single global anti-replay window. The pre-processor 920 may perform operations including: authenticating the received packet to ensure that the sequence number is trusted, discarding the received packet if the sequence number is lower than the global lowest sequence number, comparing the sequence number with received sequence numbers in the single global anti-replay window, and discarding the received packet if the sequence number matches with one of the received sequence numbers The packet processor 930 performs packet processing such as decrypting and other tasks as required by the system.

The post-processor 940 is coupled to the packet processor to post-process the received packet after packet processing using the individual per-DSCP anti-replay windows. The post-processor 940 may perform operations including: identifying a DSCP from header of the received packet, retrieving start and end pointers of the individual per-DSCP group corresponding to the identified DSCP, and checking the sequence number with the individual lowest and highest sequence numbers in the individual per-DSCP window.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. A hardware implementation may include circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include information or data that, when accessed by a machine, cause the machine to perform the operations or actions described above. The machine accessible medium may also include program code embedded therein. The program code may include machine readable code to perform the operations or actions described above. The term "information" or "data" here refers to any type of information that is encoded for machine-readable purposes. Therefore, it may include program, code, data, file, etc.

All or part of an embodiment of the invention may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    maintaining a single global anti-replay window having global lowest and highest sequence numbers for an Internet protocol security (IPSec) security association (SA), the single global anti-replay window being associated with individual differentiated services code point (DSCP) or DSCP group, the individual DSCP or DSCP group corresponding to individual per-DSCP anti-replay windows;
    pre-processing a received packet having a sequence number before packet processing using the single global anti-replay window; and
    post-processing the received packet after packet processing using the individual per-DSCP anti-replay windows, wherein post-processing comprises:
    identifying a DSCP from header of the received packet;
    retrieving start and end pointers of the individual per-DSCP group corresponding to the identified DSCP; and
    checking the sequence number with the individual lowest and highest sequence numbers in the individual per-DSCP window.

2. The method of claim 1 wherein maintaining the single global anti-replay window comprises:
    maintaining the individual per-DSCP anti-replay window for which at least one packet has been received for the IPSec SA, maintaining the individual per-DSCP anti-replay window comprising maintaining start and end pointers corresponding to individual lowest and highest sequence numbers;
    storing received sequence numbers corresponding to accepted packets; and
    advancing the single global anti-replay window when the sequence number is greater than a global maximum sequence number.

3. The method of claim 2 wherein advancing the single global anti-replay window comprises:
    truncating the single global anti-replay window from a side toward the global lowest sequence number.

4. The method of claim 1 wherein pre-processing comprises:
    authenticating the received packet to ensure that the sequence number is trusted;
    discarding the received packet if the sequence number is lower than the global lowest sequence number;
    comparing the sequence number with received sequence numbers in the single global anti-replay window; and
    discarding the received packet if the sequence number matches with one of the received sequence numbers.

5. The method of claim 1 wherein checking the sequence number comprises:
    if the sequence number is within the individual lowest and highest sequence numbers or higher than the individual highest sequence number, accepting the received packet and marking the sequence number as received in the received sequence numbers;
    if the sequence number is lower than the individual lowest sequence number, discarding the received packet; and
    if the sequence number is higher than the individual highest sequence number, advancing the individual per-DSCP window.

6. The method of claim 5 wherein advancing the individual per-DSCP window comprises:
    modifying start and end pointers of the individual per-DSCP group;
    updating the individual lowest and highest sequence numbers of the individual per-DSCP window; and
    modifying the global lowest and highest sequence numbers of the single global window if necessary.

7. The method of claim 1 wherein said packet processing comprises decrypting said packet.

8. The method of claim 1 wherein said received packet is mis-ordered.

9. A article of manufacture comprising:
    a non-transitory machine-accessible storage medium including information that, when accessed by a machine, cause the machine to perform operations comprising:
    maintaining a single global anti-replay window having global lowest and highest sequence numbers for an Internet protocol security (IPSec) security association (SA), the single global anti-replay window being associated with individual differentiated services code point (DSCP) or DSCP group, the individual DSCP or DSCP group corresponding to individual per-DSCP anti-replay windows;
    pre-processing a received packet having a sequence number before packet processing using the single global anti-replay window; and
    post-processing the received packet after packet processing using the individual per-DSCP anti-replay windows, wherein post-processing comprises:
    identifying a DSCP from header of the received packet;
    retrieving start and end pointers of the individual per-DSCP group corresponding to the identified DSCP; and
    checking the sequence number with the individual lowest and highest sequence numbers in the individual per-DSCP window.

10. The article of manufacture of claim 9 wherein the information causing the machine to perform maintaining the single global anti-replay window comprises information that, when accessed by the machine, causes the machine to perform operations comprising:

maintaining the individual per-DSCP anti-replay window for which at least one packet has been received for the IPSec SA, maintaining the individual per-DSCP anti-replay window comprising maintaining start and end pointers corresponding to individual lowest and highest sequence numbers;

storing received sequence numbers corresponding to accepted packets; and advancing the single global anti-replay window when the sequence number is greater than a global maximum sequence number.

11. The article of manufacture of claim 10 wherein the information causing the machine to perform advancing the single global anti-replay window comprises information that, when accessed by the machine, causes the machine to perform operations comprising:

truncating the single global anti-replay window from a side toward the global lowest sequence number.

12. The article of manufacture of claim 9 wherein the information causing the machine to perform pre-processing comprises information that, when accessed by the machine, causes the machine to perform operations comprising:

authenticating the received packet to ensure that the sequence number is trusted;

discarding the received packet if the sequence number is lower than the global lowest sequence number;

comparing the sequence number with received sequence numbers in the single global anti-replay window; and discarding the received packet if the sequence number matches with one of the received sequence numbers.

13. The article of manufacture of claim 9 wherein the information causing the machine to perform checking the sequence number comprises information that, when accessed by the machine, causes the machine to perform operations comprising:

if the sequence number is within the individual lowest and highest sequence numbers or higher than the individual highest sequence number, accepting the received packet and marking the sequence number as received in the received sequence numbers;

if the sequence number is lower than the individual lowest sequence number, discarding the received packet; and if the sequence number is higher than the individual highest sequence number, advancing the individual per-DSCP window.

14. The article of manufacture of claim 13 wherein the information causing the machine to perform advancing the individual per-DSCP window comprises information that, when accessed by the machine, causes the machine to perform operations comprising:

modifying start and end pointers of the individual per-DSCP group;

updating the individual lowest and highest sequence numbers of the individual per-DSCP window; and modifying the global lowest and highest sequence numbers of the single global window if necessary.

15. The article of manufacture of claim 9 wherein said packet processing comprises decrypting said packet.

16. The article of manufacture of claim 9 wherein said received packet is mis-ordered.

17. A computer system comprising:

a global window maintaining module to maintain a single global anti-replay window having global lowest and highest sequence numbers for an Internet protocol security (IPSec) security association (SA), the single global anti-replay window being associated with individual differentiated services code point (DSCP) or DSCP group, the individual DSCP or DSCP group corresponding to individual per-DSCP anti-replay windows;

a pre-processor coupled to the global window maintaining module to pre-process a received packet having a sequence number before packet processing by a packet processor using the single global anti-replay window; and a post-processor coupled to the packet processor to post-process the received packet after packet processing using the individual per-DSCP anti-replay windows wherein post-processing comprises:

identifying a DSCP from header of the received packet;

retrieving start and end pointers of the individual per-DSCP group corresponding to the identified DSCP; and checking the sequence number with the individual lowest and highest sequence numbers in the individual per-DSCP window.

18. The system of claim 17 wherein the global window maintaining module comprises:

an individual window maintaining module to maintain the individual per-DSCP anti-replay window for which at least one packet has been received for the IPSec SA, the individual window maintaining module maintaining start and end pointers corresponding to individual lowest and highest sequence numbers; and a memory to store received sequence numbers corresponding to accepted packets; and wherein the single global anti-replay window is advanced when the sequence number is greater than a global maximum sequence number.

19. A system comprising:

a sending server coupled to a network to send a packet through a virtual private network; and a receiving server coupled to the VPN to receive the packet, the receiving server having a VPN gateway, the VPN gateway including a QoS anti-replay processor, the QoS anti-replay processor comprising:

a global window maintaining module to maintain a single global anti-replay window having global lowest and highest sequence numbers for an Internet protocol security (IPSec) security association (SA), the single global anti-replay window being associated with individual differentiated services code point (DSCP) or DSCP group, the individual DSCP or DSCP group corresponding to individual per-DSCP anti-replay windows, a pre-processor is coupled to the global window maintaining module to pre-process a received packet having a sequence number before packet processing by a packet processor using the single global anti-replay window, and a post-processor coupled to the packet processor to post-process the received packet after packet processing using the individual per-DSCP anti-replay windows, wherein post-processing comprises:

identifying a DSCP from header of the received packet;

retrieving start and end pointers of the individual per-DSCP group corresponding to the identified DSCP; and checking the sequence number with the individual lowest and highest sequence numbers in the individual per-DSCP window.

20. The system of claim 19 wherein the global window maintaining module comprises:
  an individual window maintaining module to maintain the individual per-DSCP anti-replay window for which at least one packet has been received for the IPSec SA, the individual window maintaining module maintaining start and end pointers corresponding to individual lowest and highest sequence numbers; and
  a memory to store received sequence numbers corresponding to accepted packets; and
  wherein the single global anti-replay window is advanced when the sequence number is greater than a global maximum sequence number.

* * * * *